US010120299B2

(12) United States Patent
Lim et al.

(10) Patent No.: US 10,120,299 B2
(45) Date of Patent: Nov. 6, 2018

(54) LIGHT SCANNING DEVICE WITH LENS HOLDER AND IMAGE FORMING APPARATUS

(71) Applicant: S-PRINTING SOLUTION CO., LTD., Suwon-si (KR)

(72) Inventors: Heon-hee Lim, Suwon-si (KR); Han-sung Lee, Suwon-si (KR); Jin-kwon Chun, Suwon-si (KR); Sung-dae Kim, Suwon-si (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 0 days.

(21) Appl. No.: 15/604,171

(22) Filed: May 24, 2017

(65) Prior Publication Data

US 2017/0343923 A1 Nov. 30, 2017

(30) Foreign Application Priority Data

May 25, 2016 (KR) ........................ 10-2016-0064220

(51) Int. Cl.
*G03G 15/04* (2006.01)
*H04N 1/00* (2006.01)
(Continued)

(52) U.S. Cl.
CPC ......... *G03G 15/0409* (2013.01); *G02B 7/021* (2013.01); *G02B 26/124* (2013.01);
(Continued)

(58) Field of Classification Search
CPC ......... G03G 15/0409; G03G 15/04072; G03G 21/1666; G03G 2215/0404; H04N 1/024; H04N 1/02481; H04N 1/0249; H04N 2201/0446; H04N 2201/0448; G02B 7/003; G02B 7/02; G02B 7/021; G02B 7/022; G02B 7/023; G02B 26/123; G02B 26/124; G06K 15/1204; G06K 15/1238; G06K 15/1257

(Continued)

(56) References Cited

U.S. PATENT DOCUMENTS 4,647,155 A * 3/1987 Bjorklund ............. G02B 7/003
359/819
7,835,040 B2 11/2010 Seki
(Continued)

FOREIGN PATENT DOCUMENTS

JP 2005305950 A * 11/2005
JP 2011081249 A * 4/2011

*Primary Examiner* — Robert Beatty
(74) *Attorney, Agent, or Firm* — Staas & Halsey LLP

(57) ABSTRACT

Provided are an light scanning device capable of adjusting the position of optics and an image forming apparatus including the light scanning device. The light scanning device includes first and second light sources configured to emit first and second light beams, respectively; optics including first and second lenses for transmitting the first and second light beams therethrough and a lens holder configured to support the second lens; and a housing configured to support the first and second light sources and the optics, wherein the first and second light sources and the first lens are supported to be fixed to the housing, and the second lens is supported to be able to move with respect to the first lens.

19 Claims, 18 Drawing Sheets

(51) Int. Cl.
*G02B 7/00* (2006.01)
*G02B 26/00* (2006.01)
*H04N 1/024* (2006.01)
*G02B 26/12* (2006.01)
*G02B 7/02* (2006.01)
*G03G 15/043* (2006.01)
*G03G 21/16* (2006.01)

(52) U.S. Cl.
CPC ..... *G03G 15/0435* (2013.01); *G03G 21/1666* (2013.01); *H04N 1/0249* (2013.01); *H04N 2201/0448* (2013.01)

(58) Field of Classification Search
USPC .................. 399/218; 347/242, 245, 257, 258
See application file for complete search history.

(56) References Cited

U.S. PATENT DOCUMENTS

| | | | |
|---|---|---|---|
| 8,077,361 B2 | 12/2011 | Watanabe | |
| 8,284,504 B2* | 10/2012 | Kano | G02B 7/028 359/811 |
| 2003/0227659 A1* | 12/2003 | Kaneko | G02B 26/123 359/207.6 |
| 2004/0125192 A1* | 7/2004 | Ohsugi | G02B 7/026 347/233 |
| 2005/0206717 A1* | 9/2005 | Boyatt, III | B41J 2/473 347/242 |

* cited by examiner

LIGHT SCANNING DEVICE WITH LENS HOLDER AND IMAGE FORMING APPARATUS

CROSS-REFERENCE TO RELATED APPLICATION

This application claims the benefit of Korean Patent Application No. 10-2016-0064220, filed on May 25, 2016, in the Korean Intellectual Property Office, the disclosure of which is incorporated herein in its entirety by reference.

BACKGROUND

1. Field

The present disclosure relates to a light scanning device configured to form an image on a target scanning surface by reflecting and deflecting a light beam emitted from a light source and an image forming apparatus including the light scanning device.

2. Description of the Related Art

An electrophotography-type image forming apparatus, such as a laser printer, a digital copier, or a multi-function printer (MFP), forms an electrostatic latent image by scanning light beams onto a photoconductor via a light scanning device. The electrostatic latent image is developed into a developed image by using a developing agent like toner, and the developed image is transferred onto a print medium.

In order to implement a high-speed and high-resolution image forming apparatus, the rotation speed of a rotating polygonal mirror included a light scanning device may be increased or a plurality of light beams may be scanned to overlap one another. However, in the case of increasing the rotation speed of a rotating polygonal mirror, there may be problems regarding durability, noise, and vibration of a motor. On the other hand, in case of employing a light source that emits a plurality of light beams, the manufacturing cost of the image forming apparatus may increase sharply.

A plurality of light sources may be employed to emit a plurality of light beams, thereby preventing a sharp increase of the manufacturing cost. However, the aligned positions of a plurality of beam spots formed on an object to be exposed may vary according to a relative positional relationship between the plurality of light sources and optical members for guiding a plurality of light beams emitted from the plurality of light sources to the object to be exposed. A bonding technique may be employed for fixing the optical members to a housing of a light scanning device. In this case, positions of the optical members may be changed as a bonding material contracts, and thus position errors regarding beam spots may occur. In other words, intervals between the beam spots may become irregular.

SUMMARY

Provided are a light scanning device capable of adjusting the position of optics and an image forming apparatus including the light scanning device.

Additional aspects will be set forth in part in the description which follows and, in part, will be apparent from the description, or may be learned by practice of the presented embodiments.

According to an aspect of an embodiment, a light scanning device includes first and second light sources configured to emit first and second light beams, respectively; optics including first and second lenses for transmitting the first and second light beams therethrough and a lens holder configured to support the second lens; and a housing configured to support the first and second light sources and the optics, wherein the first and second light sources and the first lens are supported to be fixed to the housing, and the second lens is supported to be able to move with respect to the first lens.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
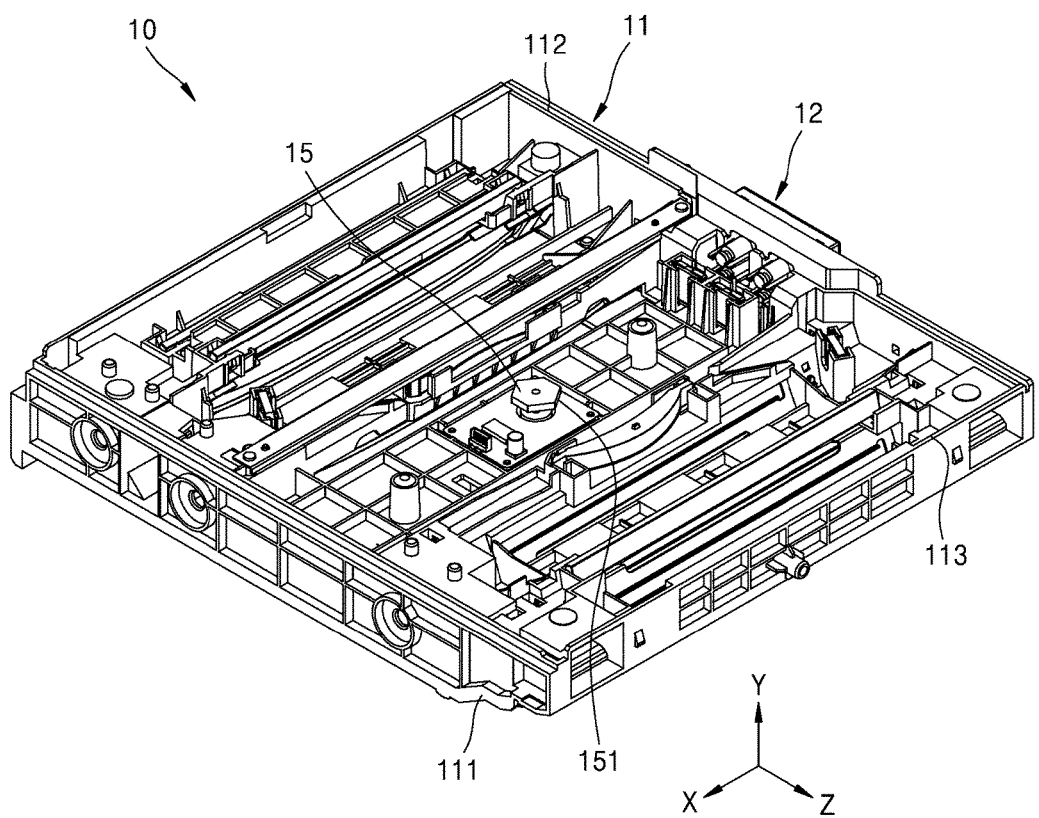
FIG. 1 is a perspective view of a light scanning device according to an example embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items.

Hereinafter, exemplary embodiments of the present disclosures will be described in detail. Also, for convenience of explanation of this disclosure, defined names may be used for similar elements. However, the names used for convenience of explanation do not limit the scope of the present disclosure and may be applied as-is to or easily modified for systems having similar technical backgrounds.

For the same reason, some of the components in the accompanying drawings are exaggerated, omitted, or schematically shown, and the size of each component does not entirely reflect the actual size. The present disclosure is not limited by the relative sizes or intervals shown in the accompanying drawings.

As used herein, the singular forms "a," "an" and "the" are intended to include the plural forms as well, unless the context clearly indicates otherwise.

In addition, the terms "-er", "-or", and "module" described in the specification mean devices for processing at least one function and operation and can be implemented by hardware components or software components and combinations thereof.

Hereinafter, X, Y, and Z do not mean an absolute three-dimensional orthogonal coordinate system. X and Y respectively denote a main scanning direction and a sub-scanning direction on an imaging plane (or a target scanning surface) on which an image is finally formed and Z denotes the optical axis direction of optics.

Figure 2A:
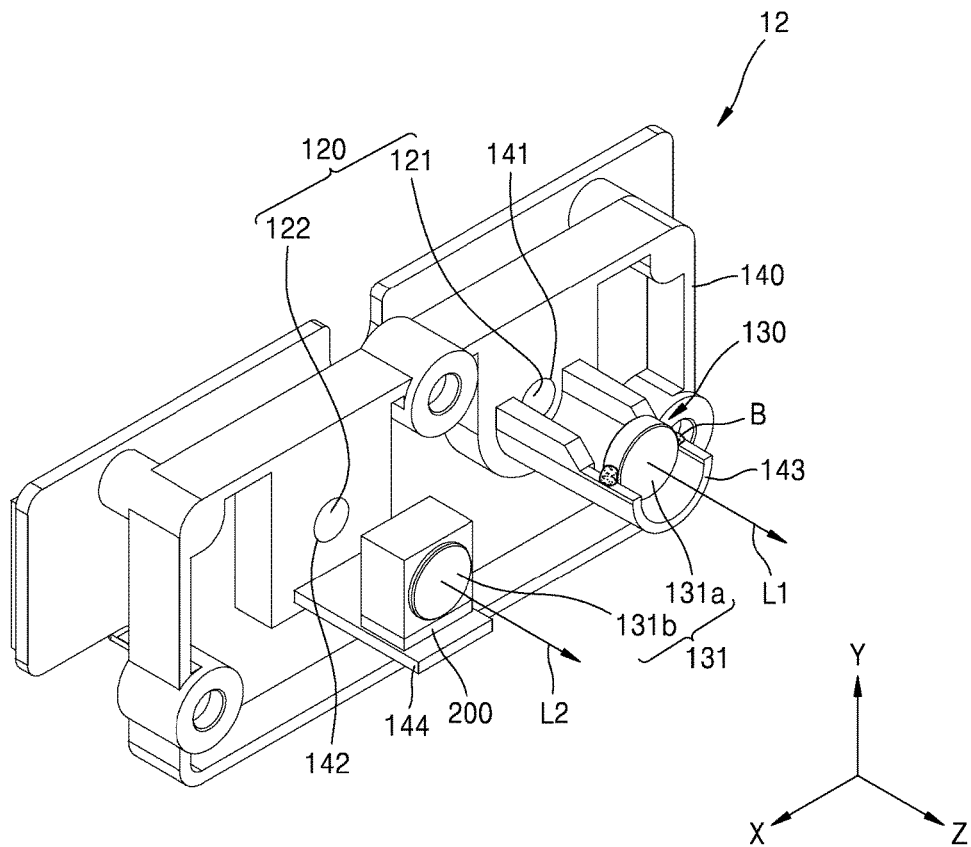
FIG. 2A is a perspective view of a light source according to an example embodiment.
Figure 2B:
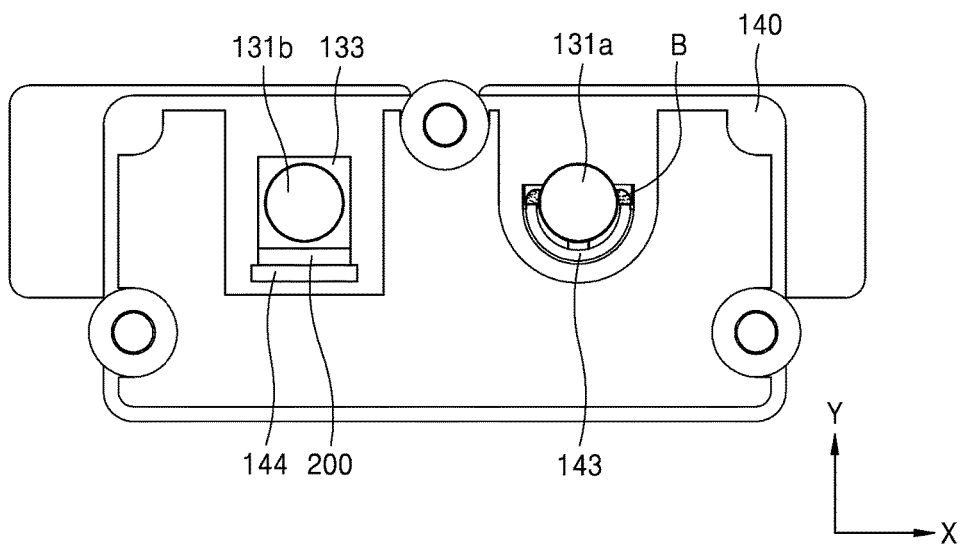
FIG. 2B is a plan view of the light source shown in FIG. 2A.

FIG. 1 is a perspective view of a light scanning device according to an example embodiment. FIG. 2A is a perspective view of a light source according to an example embodiment. FIG. 2B is a plan view of the light source shown in FIG. 2A.

Referring to FIGS. 1, 2A, and 2B, a light scanning device 10 according to the present embodiment may include a casing 11, a light source device 12 mounted in the casing 11, and a light deflector 15. According to an example embodiment, the casing 11 may be a mold structure including a plastic resin, and the casing 11 may include a base surface 111 and sidewalls 112 and 113 surrounding the base surface 111.

The light source device 12 is an optical device for guiding a light beam L emitted from a light source 120 to be incident to a deflecting surface of the light deflector 15. The light source device 12 may include the light source 120 from which the light beam L is emitted, optics (e.g., at least one optics component) 130 for guiding the light beam L to the deflecting surface of the light deflector 15, and a housing 140 for supporting the plurality of light sources 120 and the optics 130.

The light source 120 is a light emitting device capable of emitting a light beam L. For example, the light source 120 may include a laser diode. There may be the one light source 120 or the plurality of light sources 120 based on characteristics of the light source(s) 120 and the number of light beams L. According to an example embodiment, the light source 120 may include first and second light sources 121 and 122.

For example, the optics 130 may include one or more lenses, e.g., one or more collimator lenses 131. The collimator lens 131 converts a light beam L emitted from the light source 120 into a parallel light beam. For example, when first and second light beams L1 and L2 are emitted from the first and second light sources 121 and 122, first and second collimator lenses 131a and 131b are disposed on the optical paths of the first and second light beams L1 and L2 and convert the first and second light beams L1 and L2 into parallel light beams, respectively.

The housing 140 is an accommodating member capable of accommodating receiving and supporting the light source 120 and the optics 130. For example, when a tilted optics is employed and the first and second light sources 121 and 122 are disposed adjacent to each other, the housing 140 may accommodate the first and second light sources 121 and 122. For example, two fixing holes 141 and 142 may be provided in the housing 140, and the first and second light sources 121 and 122 may be respectively inserted into the two fixing holes 141 and 142 from the rear side of the housing 140.

The first and second collimator lenses 131a and 131b may be supported to the housing 140 via bonding or mechanical fixation. For example, the first and second collimator lenses 131a and 131b may be installed in front of the two fixing holes 141 and 142. At this time, the first collimator lens 131a may be fixed directly to a first lens support 143 provided at the housing 140. For example, a bonding portion B for fixing the first collimator lens 131a to the first lens support 143 may be disposed by applying a bonding material between the first collimator lens 131a and the first lens support 143 and curing the bonding material by irradiating UV light to the bonding material. The second collimator lens 131b may be supported by a lens holder 133. Here, the lens holder 133 may be movably supported by a second lens support 144 provided at the housing 140. Detailed descriptions thereof will be given below with reference to FIGS. 5 through 15. The housing 140 may be disposed by using a plastic resin mold to be integrated with a sidewall 112 of the casing 11. However, the present disclosure is not limited thereto, and the housing 140 may be fabricated separately from the casing 11 and fixed to the casing 11.

The light deflector 15 may deflect and scan a plurality of light beams L emitted from the plurality of light sources 120 to a main scanning direction X. According to an example embodiment, the light deflector 15 may include a polygonal rotating mirror 151 having a plurality of reflecting surfaces (that is, deflecting surfaces) that rotate around a rotating shaft and a driving motor (not shown) for rotating the polygonal rotating mirror 151. In another example, the light deflector 15 may be a micro-electromechanical systems (MEMS) mirror.

Figure 3:
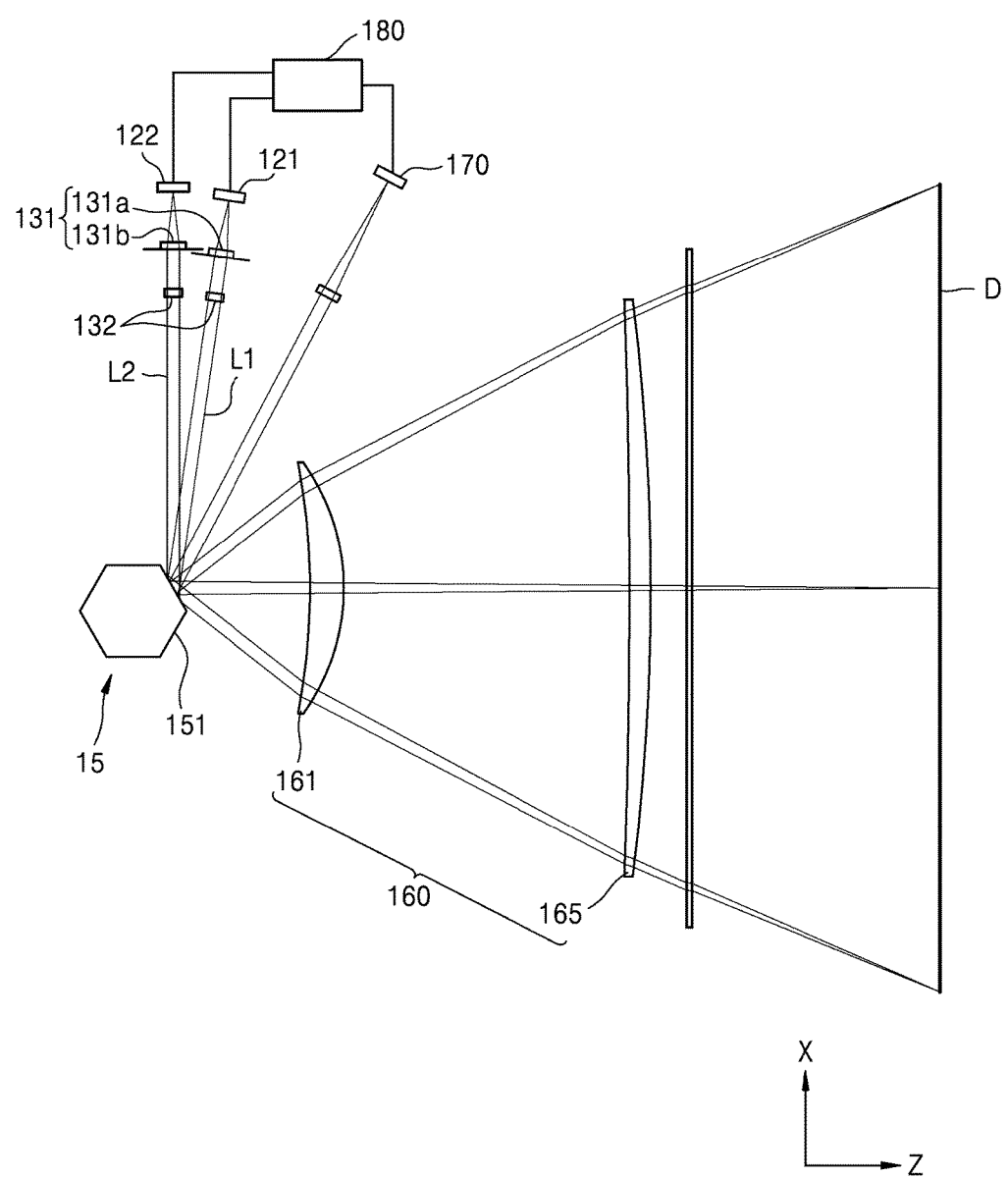
FIG. 3 is a schematic diagram showing a traveling path of a light beam emitted from a light source according to an example embodiment.
Figure 4:
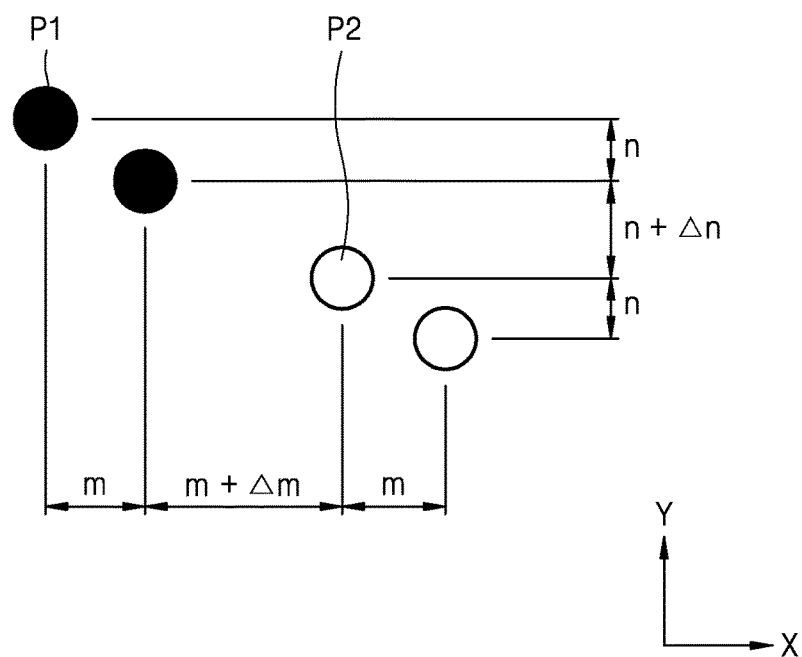
FIG. 4 is a diagram showing a beam spot at which the light beam of FIG. 3 forms an image on a scanning surface.

FIG. 3 is a schematic diagram showing a traveling path of a light beam emitted from a light source according to an example embodiment. FIG. 4 is a diagram showing a beam spot at which the light beam of FIG. 3 forms an image on a scanning surface.

Referring to FIGS. 3 and 4, first and second light beams L1 and L2 may be respectively emitted from the first and second light sources 121 and 122 according to an example embodiment. At this time, the first and second light beams L1 and L2 may pass through the collimator lens 131 and a cylindrical lens 132 and may be incident to the deflecting surface 151 of the light deflector 15. The cylindrical lens 132 concentrates a plurality of light beams L onto the deflecting surface of the light deflector 15.

The first and second light beams L1 and L2 reflected by the deflecting surface of the light deflector 15 pass through an image forming optics 160 and form images on a target scanning surface D, e.g., an outer peripheral surface of a photoconductor. The image forming optics 160 may include lenses having an fθ characteristic that corrects the first and second light beams L1 and L2 to be scanned onto the target scanning surface D in a main scanning direction X at an equal velocity. For example, the image forming optics 160 may include a primary scanning lens 161 and a secondary scanning lens 165 that are provided on the optical paths of a plurality of light beams L. Here, the primary scanning lens 161 may be designed to have a refracting power in a sub-scanning direction almost equal to zero and the secondary scanning lens 165 may be designed to have a demanded refracting power in the sub-scanning direction. The structure of the image forming optics 160 is not limited to the example shown in FIG. 3, and the image forming optics 160 may include three or more lenses.

It is necessary for the first and second light beams L1 and L2 to form images on the target scanning surface D with constant intervals m and n therebetween along the main scanning direction X and a sub-scanning direction Y. When there is no relative position error between the first and second collimator lenses 131a and 131b, the first and second light beams L1 and L2 form images at uniform positions on the target scanning surface D. As shown in FIG. 4, when there is a position error between the first and second collimator lenses 131a and 131b, two first beam spots P1 adjacent to each other and two second beam spots P2 adjacent thereto have constant intervals m and n in the main scanning direction X and the sub-scanning direction Y, but intervals between the first beam spot P1 and the second beam spot P2 adjacent to each other are m+Δm and n+Δn, respectively. Therefore, the intervals between the beam spots that are formed on the target scanning surface D by the first and second light beams L1 and L2 becomes irregular.

For example, when the first and second collimator lenses 131a and 131b are fixed to the housing 140 via the bonding portion B, relative positions of the first and second collimator lenses 131a and 131b may be changed due to contraction of the bonding portion B. At this time, the positions of the first and second beam spots P1 and P2 formed by the first and second light beams L1 and L2 may also be changed, and thus the first and second beam spots P1 and P2 may be arranged at irregular intervals along the main scanning direction X and the sub-scanning direction Y.

An interval error Δm in the main scanning direction X, which is the scanning direction of the light scanning device 10, may be compensated for by adjusting emission starting time points of the first and second light beams L1 and L2. For example, some of the first and second light beams L1 and L2 incident to the deflecting surface of the light deflector 15 as shown in FIG. 3 may be incident to a sensor 170. The sensor 170 detects the first and second light beams L1 and L2. A controller 180 may control light emission starting time points of the first and second light sources 121 and 122 to compensate for a time difference between signals regarding detections of the first and second light beams L1 and L2 transmitted from the sensor 170. Therefore, the interval error Δm in the main scanning direction X may be compensated for.

In the case of the sub-scanning direction Y in which a paper is transported, an interval error Δn in the sub-scanning direction Y may be compensated for by adjusting the relative positions of the first and second collimator lenses 131a and 131b. The positions of the first and second collimator lenses 131a and 131b may be adjusted by adjusting the position of any one of the first and second collimator lenses 131a and 131b based on the position of the other one. Hereinafter, a case of adjusting the position of the second collimator lens 131b based on the position of the first collimator lens 131a will be described.

Figure 5:
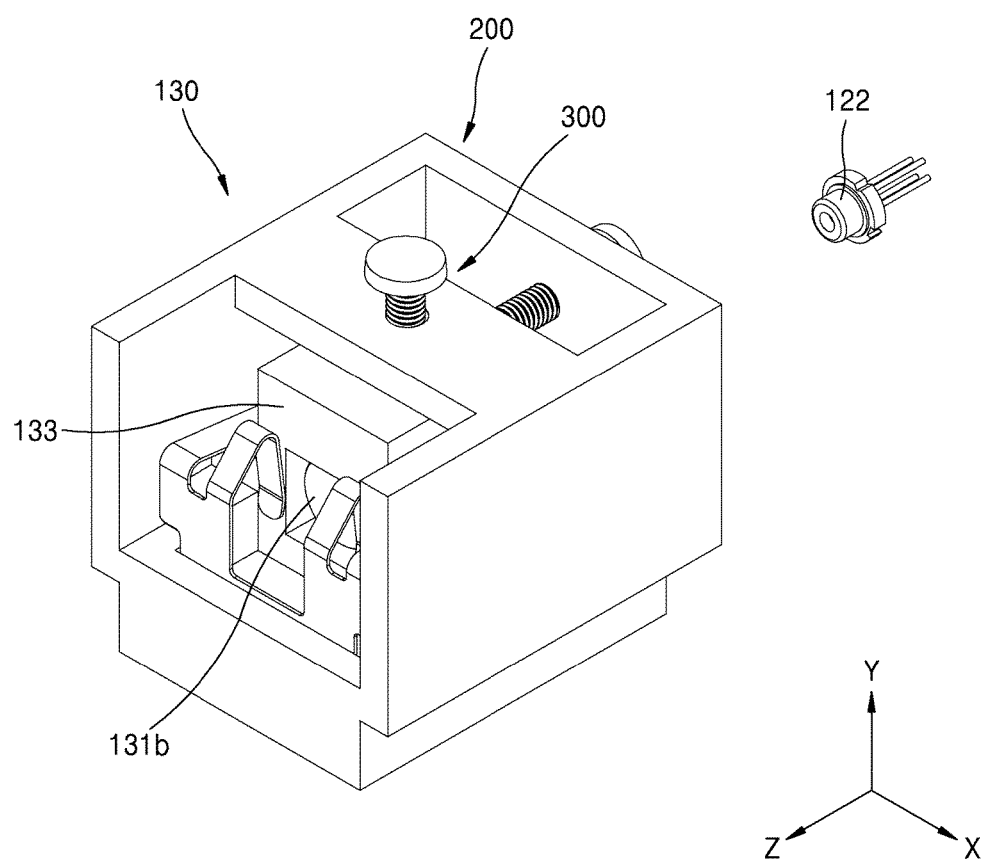
FIG. 5 is a perspective view of optics according to an example embodiment.
Figure 6:
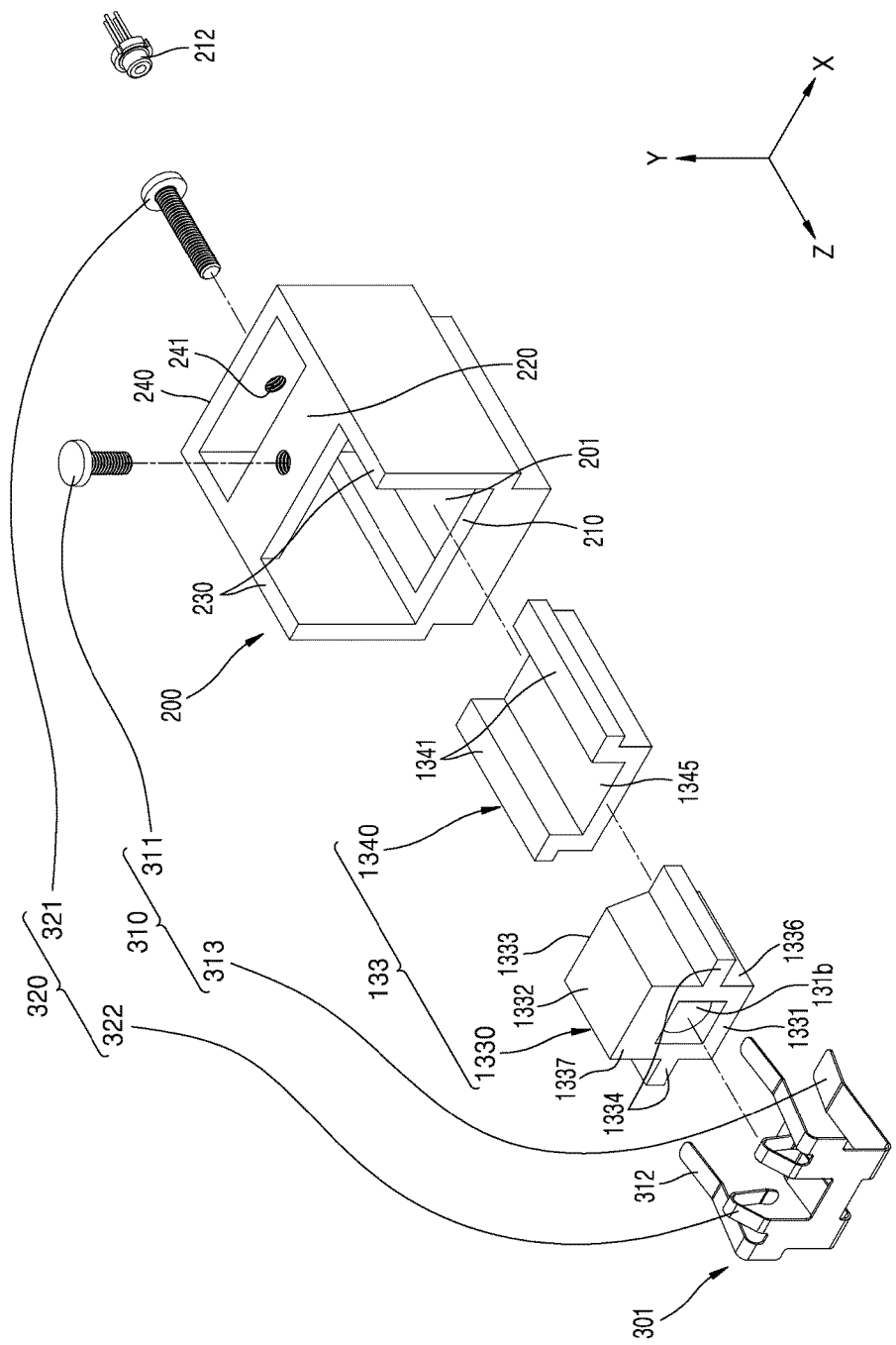
FIG. 6 is an exploded perspective view of the optics shown in FIG. 5.

FIG. 5 is a perspective view of optics according to an example embodiment. FIG. 6 is an exploded perspective view of the optics shown in FIG. 5.

Referring to FIGS. 5 and 6, the optics 130 may include the second collimator lens 131b and the lens holder 133 supporting the second collimator lens 131b. The support 200 may include a base 210 and an upper portion 220 that face each other in the sub-scanning direction Y and side portions 230 and 240 interconnecting the base 210 and the upper portion 220. First and second via holes 221 and 241 through which first and second screws 311 and 321 pass as described below may be arranged at the upper portion 220 and the side portion 240 in the optical axis direction Z. The support 200 is a separate element shown in FIG. 2 and may be fixed to the housing 140. Although not shown, the support 200 may also be integrally formed with the housing 140.

The lens holder 133 may include a first lens holder 1330 and a second lens holder 1340 that support the second collimator lens 131b. The first lens holder 1330 may have a lens supporting hole 1331 extending in the optical axis direction Z and first and second holder surfaces 1332 and 1333 respectively contacting ends of the first and second screws 311 and 321.

The second collimator lens 131b may be fixed to the lens supporting hole 1331 via mechanical pressing or bonding.

The first lens holder 1330 is supported by the second lens holder 1340 to be able to move in the optical axis direction Z. For example, the first lens holder 1330 may include a lens holder guide 1336 and a first flange 1334 protruding from the lens holder guide 1336 in the main scanning direction X. The second lens holder 1340 may include a holder guide groove 1345, which extends in the optical axis direction Z and accommodates the lens holder guide 1336 inserted thereto, and a second flange 1341 by which the first flange 1334 is supported in the sub-scanning direction Y.

As the lens holder guide 1336 is inserted into the lens holder guide groove 1345, movement of the first lens holder 1330 with respect to the second lens holder 1340 in the main scanning direction X is restricted. An elastic member 301 includes a pair of elastic arms 312 and 313. The pair of elastic arms 312 and 313 press the first and second flanges 1334 and 1341 toward each other, respectively. As the first flange 1334 is supported by the second flange 1341, movement of the first lens holder 1330 with respect to the second lens holder 1340 in the sub-scanning direction Y is restricted. The elastic member 301 may further include an elastic arm 322 that applies an elastic force to the first lens holder 1330 in the optical axis direction Z. The lens holder 133 is accommodated in an accommodating portion 201 provided in the support 200. The accommodating portion 201 has a shape capable of allowing movement of the lens holder 133 in the sub-scanning direction Y and restricting movement of the lens holder 133 in the optical axis direction Z. For example, sidewalls of any one of the first and second flanges 1334 and 1341 may be supported by the side portion 230 in the main scanning direction X. Therefore, the lens holder 133 is supported by the support 200 to be able to move in the sub-scanning direction Y.

An adjuster 300 may include a first adjuster 310 for moving the second collimator lens 131b in the sub-scanning direction Y. For example, the first adjuster 310 may move the lens holder 133 in the sub-scanning direction Y with respect to the support 200.

The first adjuster 310 may include a first presser (e.g., the first screw 311) capable of applying a first adjustment force to the lens holder 133 in the sub-scanning direction Y, and a first elastic member that elastically biases the lens holder 133 toward the first screw 311. The first elastic member generates a recovery force against a force applied by the first screw 311 (e.g., in a sub-scanning direction −Y). The first screw 311 is fastened to the via hole 221 formed in the upper portion 220 of the support 200 and an end of the first screw 311 contacts the first holder surface 1332 of the first lens holder 1330. A female screw thread may be formed in the via hole 221. The first elastic member may include the elastic arm 313 of the elastic member 301, for example. Referring to FIG. 6, the elastic arm 313 has a "V"-like shape convex toward the lens holder 133 and is interposed between the second lens holder 1340 and the support 200. Specifically, the elastic arm 313 is interposed between the second flange 1341 and the base 210. Therefore, the lens holder 133 may be elastically biased toward the first screw 311 with respect to the support 200. The first elastic member may also include a leaf spring or a coil spring other than the elastic member 301.

The adjuster 300 may further include a second adjuster 320 for moving the second collimator lens 131b in the optical axis direction Z. For example, the second adjuster 320 may move the first lens holder 1330 with respect to the second lens holder 1340 in the optical axis direction Z. The second adjuster 320 may include a second presser (e.g., a second screw 321) capable of applying a second adjustment force to the first lens holder 1330 in the optical axis direction Z and a second elastic member that elastically biases the first lens holder 1330 toward the second screw 321. The second elastic member generates a recovery force against a force applied by the second screw 321 (e.g., in the optical axis direction −Z). The second screw 321 is fastened to the via hole 241 formed in the side portion 240 of the support 200 in the optical axis direction Z of the support 200, and an end of the second screw 321 contacts the second holder surface 1333 of the first lens holder 1330. A female screw thread may be formed in the via hole 241. The second elastic member may include the elastic arm 322 of the elastic member 301, for example. For example, the elastic arm 322 pushes a third holder surface 1337 of the first lens holder 1330. The second elastic member may also include a leaf spring or a coil spring other than the elastic member 301

Hereinafter, movement of the lens holder 133 by the first and second adjusters 310 and 320 will be described.

Figure 7A:
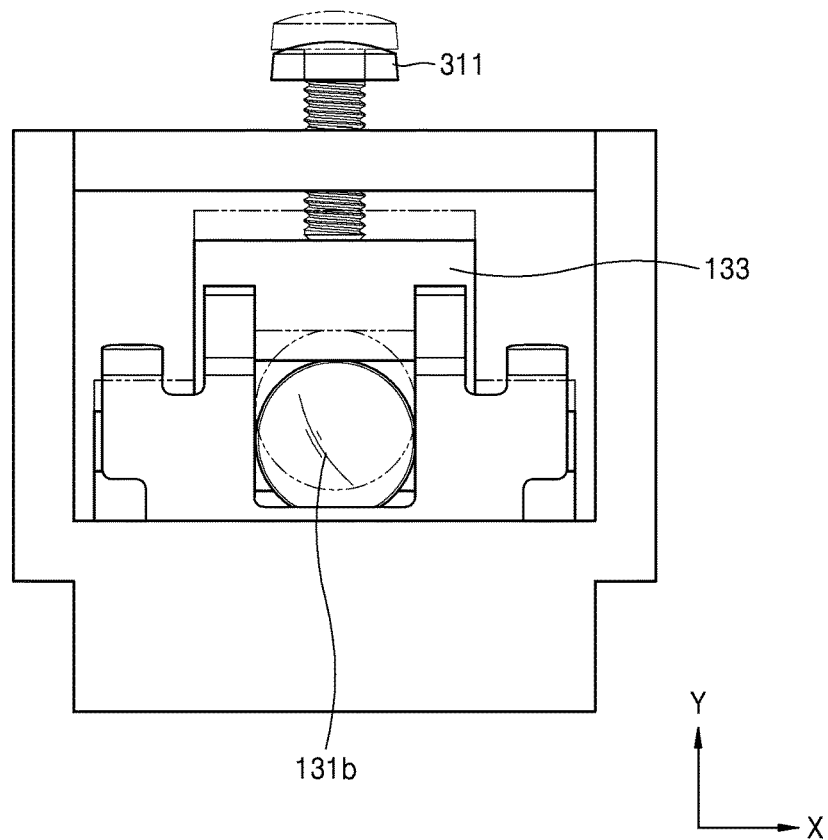
FIG. 7A is a front view of optics according to an example embodiment.
Figure 7B:
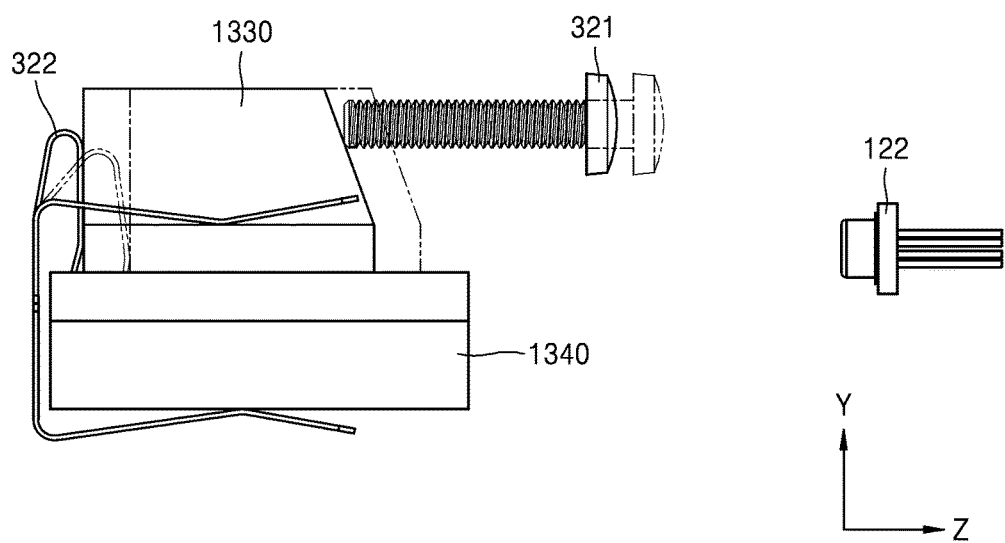
FIG. 7B is a side view of optics according to an example embodiment.

FIG. 7A is a front view of optics according to an example embodiment. FIG. 7B is a side view of optics according to an example embodiment.

Referring to FIGS. 7A and 7B, when the first screw 311 is lowered toward the lens holder 133 in the sub-scanning direction Y by rotating the first screw 311, the lens holder 133 is pushed by the first screw 311 and is moved in the opposite direction of the elastic force of the elastic arm 313 shown in FIG. 6. In other words, the lens holder 133 is moved toward the base 210. When the first screw 311 is raised in a direction away from the lens holder 133 by rotating the first screw 311 in the opposite direction, the lens holder 133 is moved in a direction away from the base 210 in the sub-scanning direction Y due to the recovery force of the elastic arm 313.

As described above, as the lens holder 133 is moved in the sub-scanning direction Y, the second collimator lens 131b is also moved in the sub-scanning direction Y, and thus image forming location of the second beam spot P2 in the sub-scanning direction Y is changed. As described above, by moving the lens holder 133 in the sub-scanning direction Y by using the first adjuster 310, the position error Δn of the second beam spot P2 in the sub-scanning direction Y may be compensated for.

When the second screw 321 is moved toward the first lens holder 1330 in the optical axis direction Z by rotating the second screw 321, the first lens holder 1330 is moved in the opposite direction of the elastic force of the second elastic member, that is, the elastic arm 322. When the second screw 321 is moved away from the first lens holder 1330 in the optical axis direction Z by rotating the second screw 321 in the opposite direction, the first lens holder 1330 is moved together with the second screw 321 due to the elastic force of the second elastic member.

As described above, as the first lens holder 1330 is moved in the optical axis direction Z, the second collimator lens 131b is also moved in the optical axis direction Z, and thus image forming location of the second beam spot P2 in the sub-scanning direction Y is changed. As described above, when the second adjuster 320 is further disposed, the position error Δn of the second beam spot P2 in the sub-scanning direction Y may be more precisely compensated for.

Figure 8A:
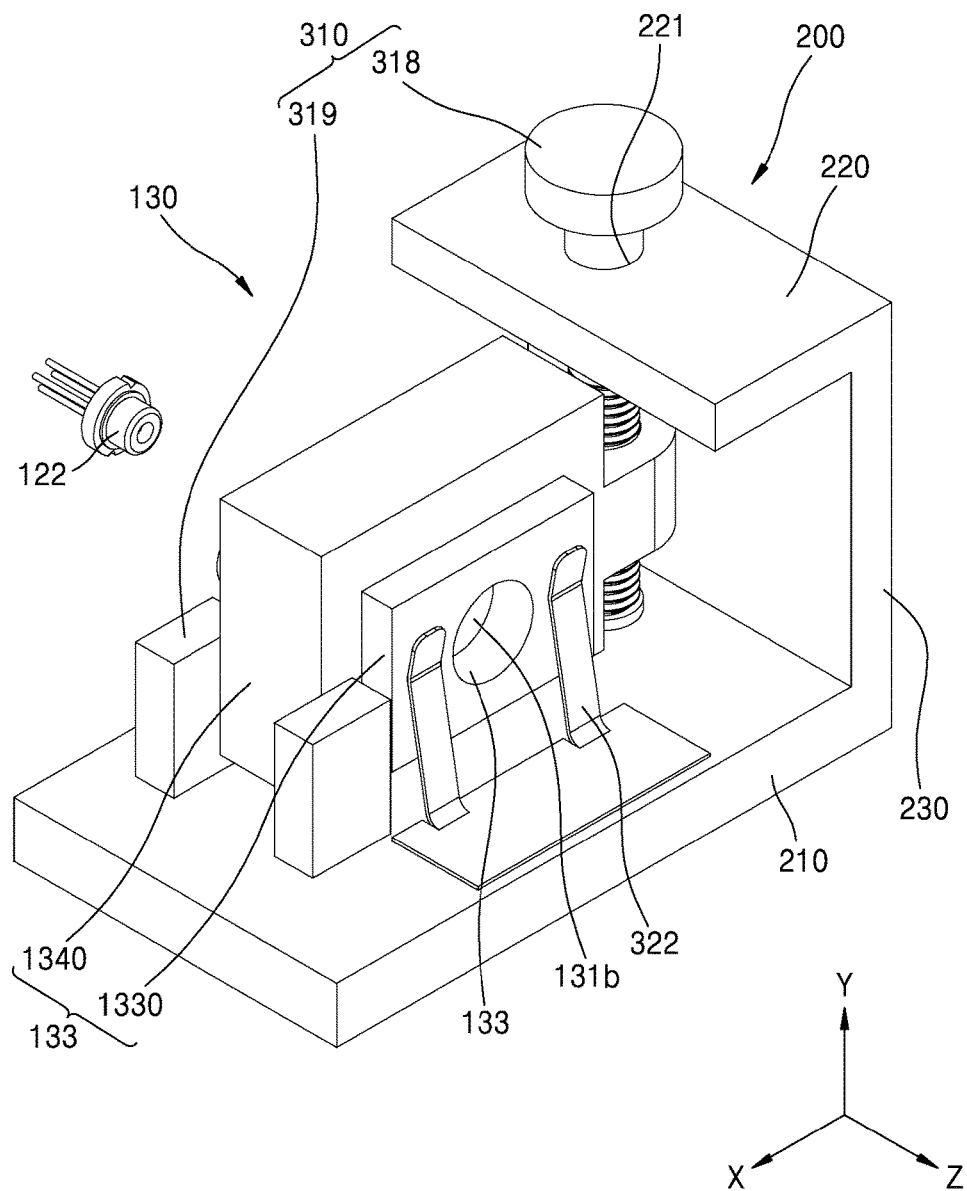
FIGS. 8A and 8B are perspective views of optics according to an example embodiment.
Figure 8B:
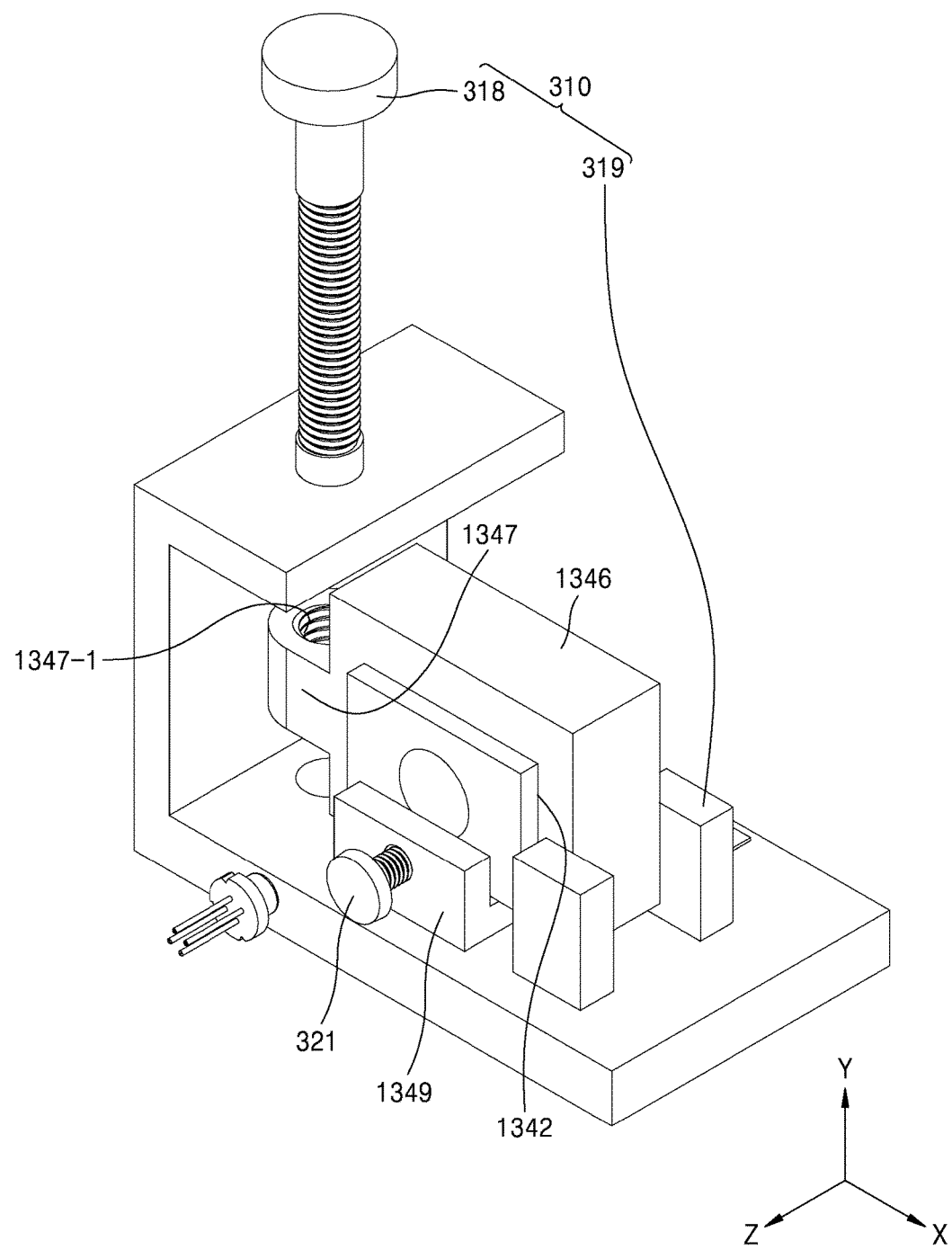

FIGS. 8A and 8B are perspective views of optics according to an example embodiment.

Referring to FIGS. 8A and 8A, the optics 130 may include the second collimator lens 131b and the lens holder 133 supporting the second collimator lens 131b. The support 200 may accommodate and support the lens holder 133 and may include the base 210, the upper portion 220 facing the base 210 in the sub-scanning direction Y, and the side portion 230 interconnecting the base 210 and the upper portion 220. At this time, the support 200 may be disposed to be fixed to the housing 140 shown in FIG. 2 or may be integrated with the housing 140.

The lens holder 133 may include the first lens holder 1330 supporting the second collimator lens 131b and the second lens holder 1340 supporting the first lens holder 1330. The first lens holder 1330 may include the lens supporting hole 1331 extending in the optical axis direction Z. The second collimator lens 131b may be fixed to the lens supporting hole 1331 via bonding or mechanical pressing, for example.

The first lens holder 1330 is supported by the second lens holder 1340 to be able to move in the optical axis direction Z. For example, the second lens holder 1340 may include a main body 1346 and a holder guide groove 1342 formed through the main body 1346 in the optical axis direction Z. The first lens holder 1330 is inserted to the holder guide groove 1342 to be able to move in the optical axis direction Z.

The second lens holder 1340 is supported by the support 200 to be able to move in the sub-scanning direction Y. For example, the second lens holder 1340 is accommodated between a pair of guide walls 319 that extend from the base 210 in sub-scanning direction Y and are apart from each other in the optical axis direction Z. An accommodating portion in which the lens holder 133 is accommodated may be implemented by the pair of guide walls 319. The second lens holder 1340 may be guided by the pair of guide walls 319 and moved in the sub-scanning direction Y.

The adjuster 300 may include the first and second adjusters 310 and 320 capable of moving the lens holder 133 in the sub-scanning direction Y and the optical axis direction Z.

The first adjuster 310 may include a transporter capable of transporting the lens holder 133 in the sub-scanning direction Y, e.g., a lead screw 318 and a transporting guide 1347 to which the lead screw 318 is inserted. The lead screw 318 is rotatably installed to the support 200. For example, a first end and a second end of the lead screw 318 may be rotatably supported by the base 210 and the upper portion 220. The via hole 221 supporting the second end of the lead screw 318 may be formed in the upper portion 220. The transporting guide 1347 extends from the main body 1346 and may include a threaded hole 1347-1 that is interlocked with the lead screw 318. For example, the gear 1347-1 may be in the form of a protrusion that is interlocked with the spiral thread of the lead screw 318 and may be in the form of a female screw thread to be interlocked with the male screw thread of the lead screw 318. The pair of guide walls 319 may function as a rotation preventer that prevents the lens holder 133 from rotating around the lead screw 318 when the lead screw 318 is rotated. The second adjuster 320 may include a second presser capable of applying a second adjustment force to the first lens holder 1330 in the optical axis direction Z, e.g., the second screw 321 and the elastic arm 322 capable of generating a recovery force against a force applied by the second screw 321. For example, the second screw 321 is supported by the second lens holder 1340 to be able to be moved back and forth in along an optical axis Z (e.g. in a positive optical axis direction Z or a negative optical axis direction −Z). For example, the second lens holder 1340 may further include a screw support 1349, which extends in the sub-scanning direction Y and coupled with the second screw 321. Although not shown, the screw support 1349 may extend from the support 200. An end of the second screw 321 contacts the first holder surface 1332 of the first lens holder 1330. The elastic arm 322 elastically biases the first lens holder 1330 toward the second screw 321. The elastic arm 322 may be supported by the support 200. For example, the elastic arm 322 may be supported by the base 210 or the second lens holder 1340.

Hereinafter, movement of the lens holder 133 by the first and second adjusters 310 and 320 will be described.

Figure 9A:
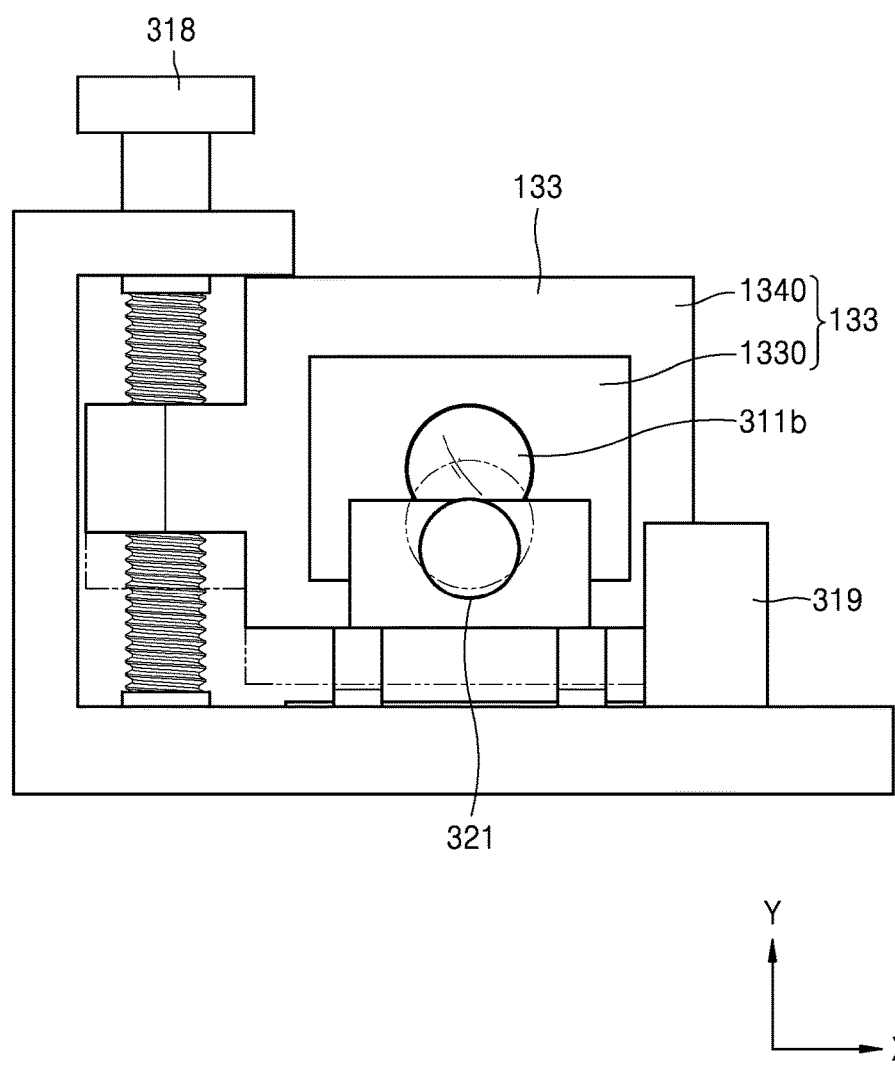
FIG. 9A is a front view of optics according to an example embodiment.
Figure 9B:
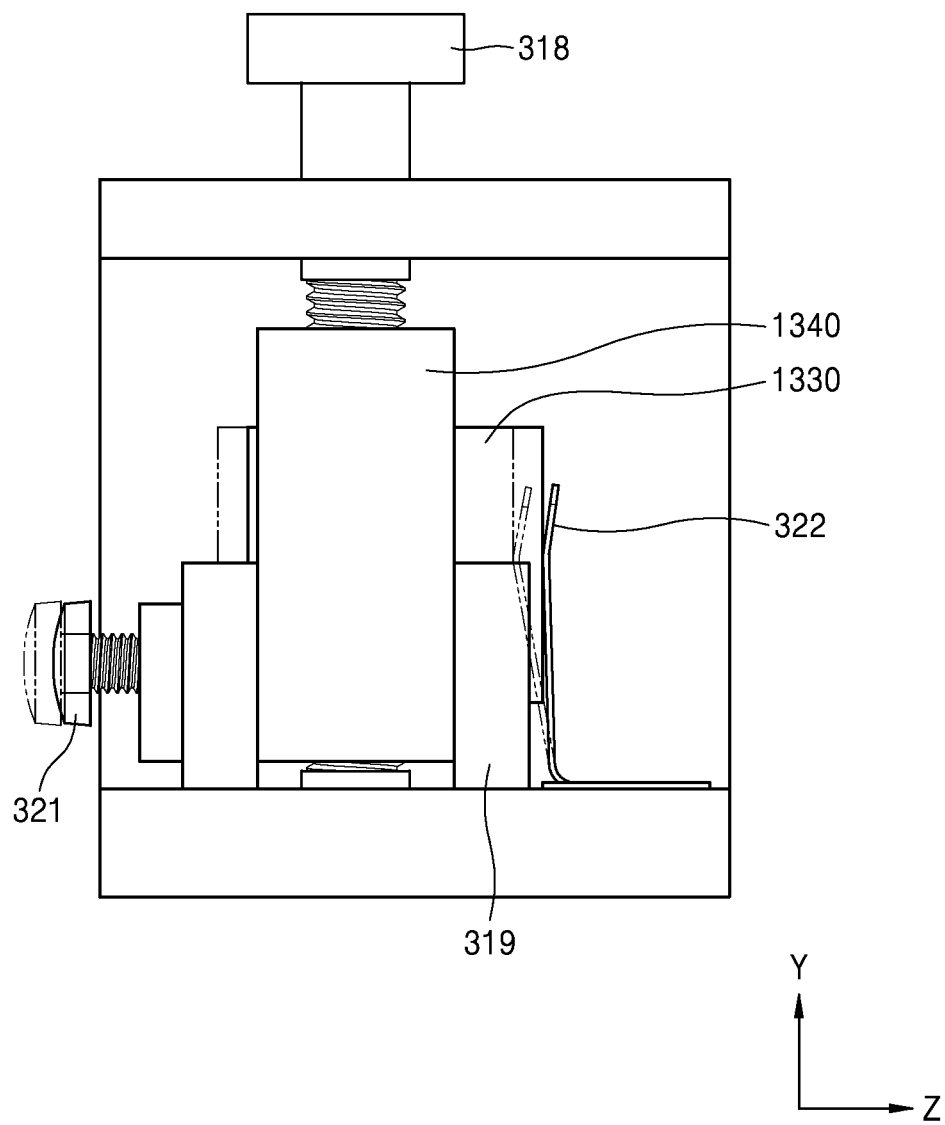
FIG. 9B is a side view of optics according to an example embodiment.

FIG. 9A is a front view of optics according to an example embodiment. FIG. 9B is a side view of optics according to an example embodiment.

Referring to FIGS. 9A and 9B, when the lead screw 318 is rotated/reverse-rotated, the lead screw 318 is rotated at a same location, and the second lens holder 1340 may be moved up or down in the sub-scanning direction Y. At this time, the rotation of the second lens holder 1340 may be prevented by the pair of guide walls 319.

When the second screw 321 is rotated in a direction, the first lens holder 1330 may slide with respect to the second lens holder 1340 in a first direction along the optical axis Z. When the second screw 321 is rotated in the opposite direction, the first lens holder 1330 may slide with respect to the second lens holder 1340 in another direction along the optical axis Z due to the recovery force of the elastic arm 322.

As described above, as the lens holder 133 is moved in the sub-scanning direction Y and the optical axis direction Z, the second collimator lens 131b may also be moved in the sub-scanning direction Y and the optical axis direction Z. Therefore, the position error Δn of the second beam spot P2 in the sub-scanning direction Y may be compensated for.

Figure 10:
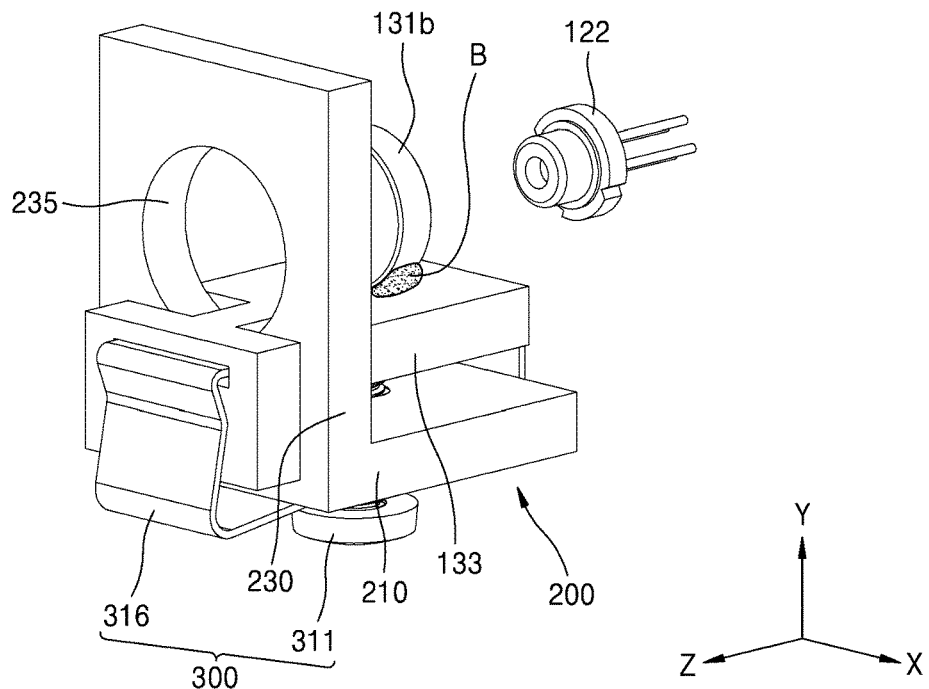
FIGS. 10 and 11 are perspective views of optics according to an example embodiment.
Figure 11:
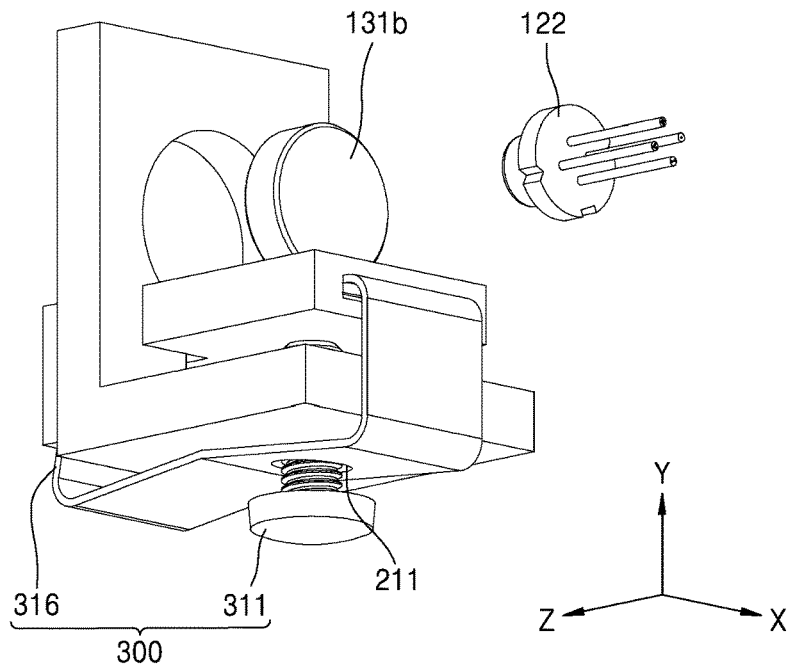

FIGS. 10 and 11 are perspective views of optics according to an example embodiment.

Referring to FIGS. 10 and 11, the optics 130 may include the second collimator lens 131b and the lens holder 133 supporting the second collimator lens 131b. The support 200 may accommodate and support the lens holder 133 and may include the base 210 and the side portion 230. A guide wall 211 through which the first screw 311 passes as described below may be disposed at the base 210, and an optical window 235 through which a light beam L passes may be disposed in the side portion 230. At this time, the support 200 may be disposed to be fixed to the housing 140 shown in FIG. 2 or may be integrated with the housing 140.

For example, the lens holder 133 may have a plate-like shape and may accommodate and support the second collimator lens 131b on the top surface of the lens holder 133. At this time, the second collimator lens 131b may be fixed to the lens holder 133 via the bonding portion B. In other words, not only may the first collimator lens 131a be fixed to the housing 140 via bonding, but the second collimator lens 131b may also be fixed to the lens holder 133 via bonding. However, the present disclosure is not limited thereto, and the second collimator lens 131b may be supported to be pressed to the lens holder 133 via a mechanical restricting device.

The adjuster 300 may include the first screw 311 capable of applying a force to the lens holder 133 in the sub-scanning direction Y and the elastic member 316 capable of generating a recovery force against the force applied by the first screw 311. The first screw 311 is pressed against the bottom surface of the lens holder 133. The elastic member 316 may be a leaf spring, for example, may be supported by the base 210 and the side portion 230, and may apply a recovery force to the lens holder 133 in the sub-scanning direction Y. Hereinafter, movement of the lens holder 133 by the adjuster 300 will be described.

Figure 12:
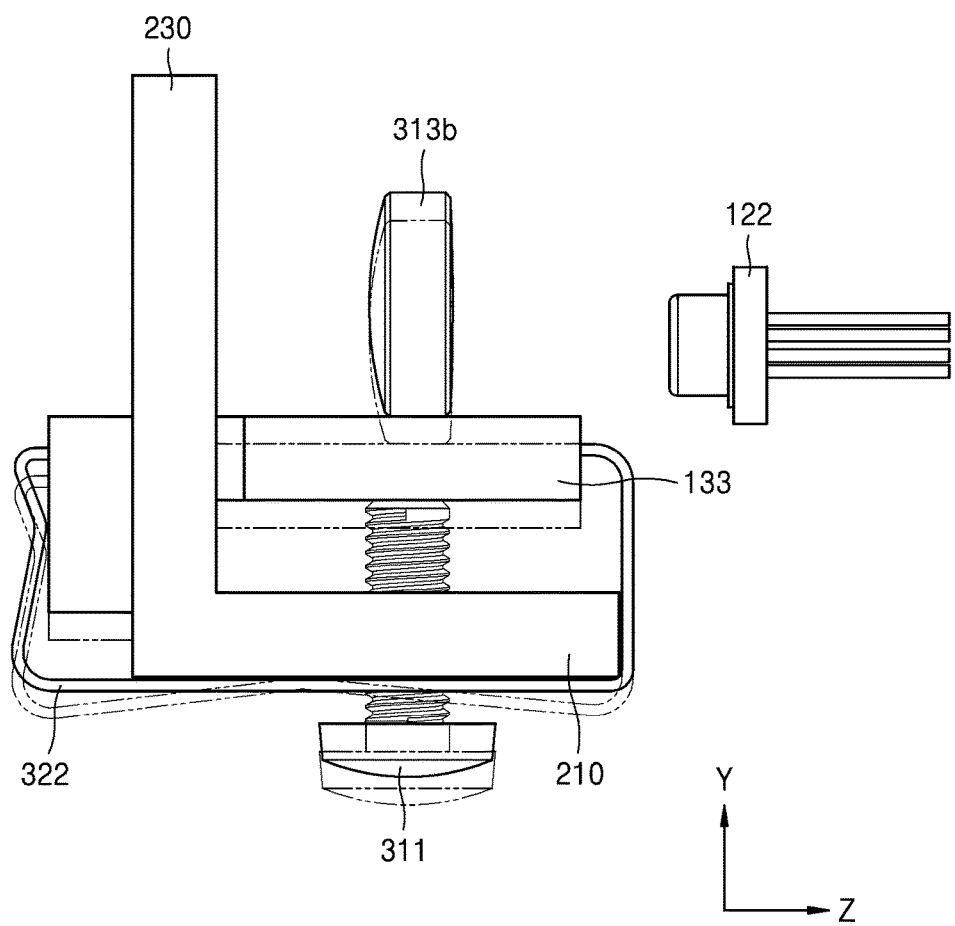
FIG. 12 is a side view of optics according to an example embodiment.

FIG. 12 is a side view of optics according to an example embodiment.

Referring to FIG. 12, when the first screw 311 is raised in the sub-scanning direction Y by rotating the first screw 311, the lens holder 133 pressed against the first screw 311 may be raised in the sub-scanning direction Y. When the first screw 311 is lowered in the sub-scanning direction Y by rotating the first screw 311 in the opposite direction, the lens holder 133 may be moved downward in the sub-scanning direction Y by the recovery force of the elastic member 312.

As described above, as the lens holder 133 is moved in the sub-scanning direction Y, the second collimator lens 131b may also be moved in the sub-scanning direction Y. Thus, the position error Δn of the second beam spot P2 in the sub-scanning direction Y may be compensated for.

Figure 13:
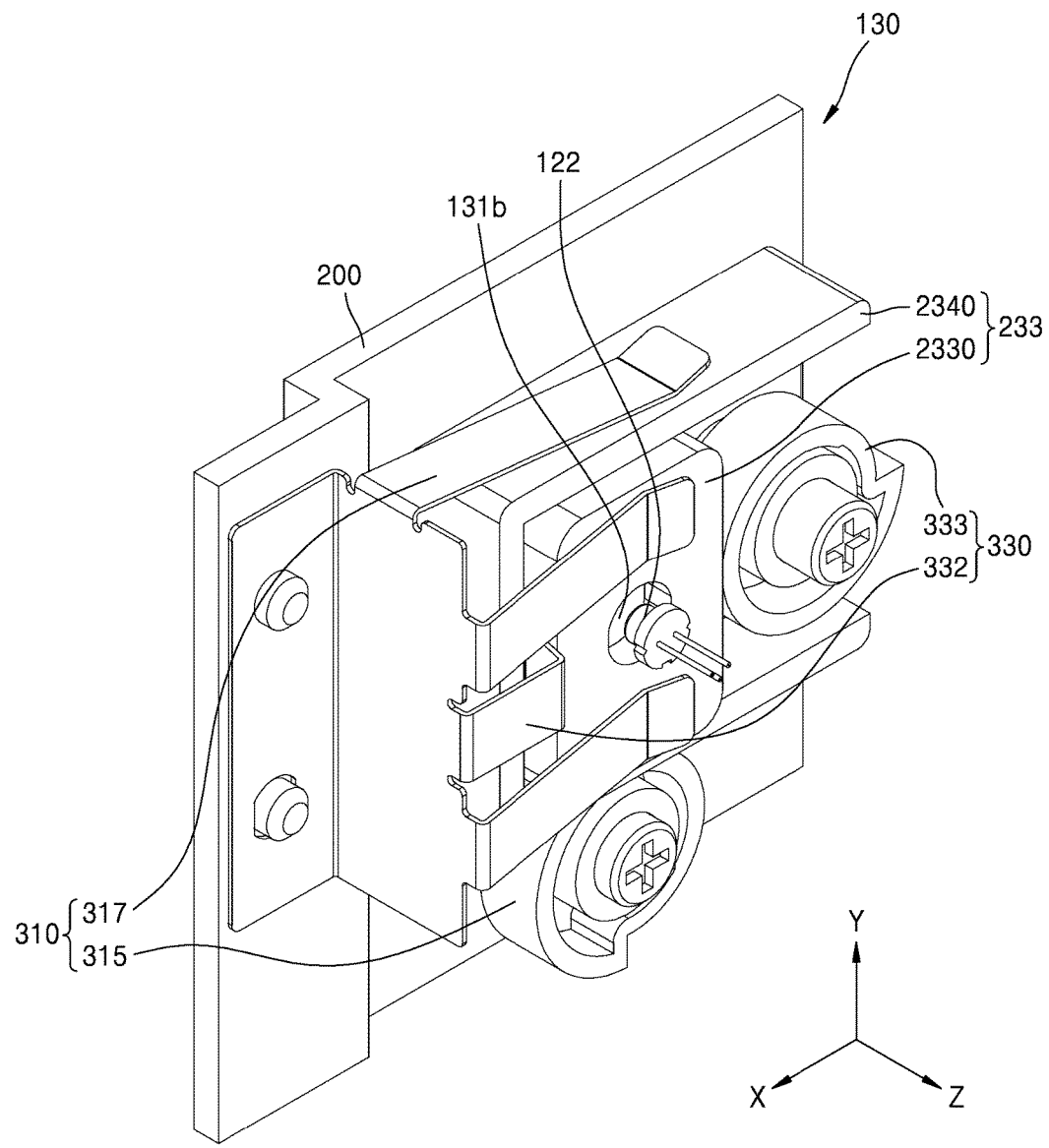
FIG. 13 is a perspective view of optics according to an example embodiment.
Figure 14:
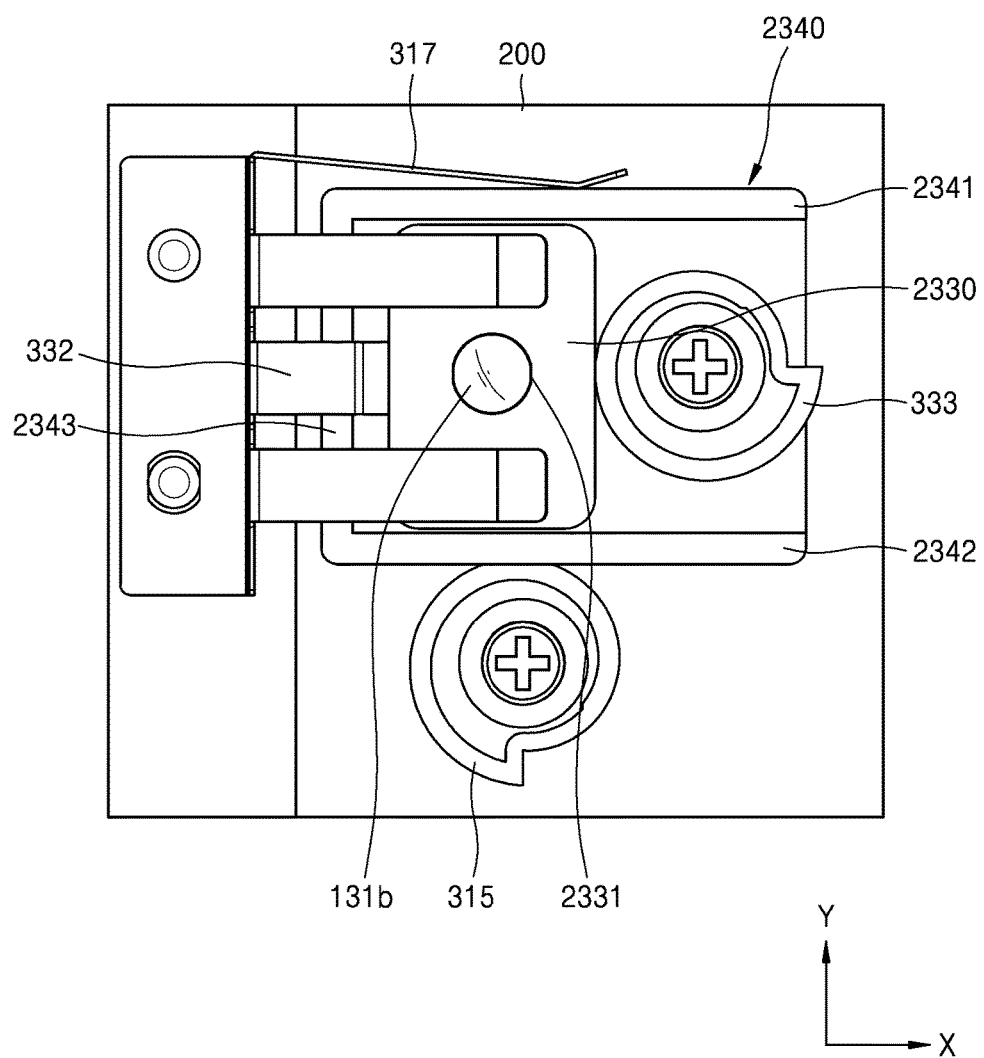
FIG. 14 is a plan view of the optics shown in FIG. 13.

FIG. 13 is a perspective view of optics according to an example embodiment. FIG. 14 is a plan view of the optics shown in FIG. 13.

In the above-described embodiments, an interval between the first and second beam spots P1 and P2 in the main scanning direction X is adjusted by controlling the emission starting time points regarding the first and second light beams L1 and L2. According to the present embodiment, adjustments of intervals between the first and second beam spots P1 and P2 in the sub-scanning direction Y as well as in the main scanning direction X via adjustments of the relative positions of the first and second collimator lenses 131a and 131b will be described.

Referring to FIGS. 13 and 14, the optics 130 may include the second collimator lens 131b and a lens holder 233 supporting the second collimator lens 131b. The support 200 may have a plate-like shape and may accommodate and support the lens holder 233. At this time, the support 200 may be disposed to be fixed to the housing 140 shown in FIG. 2. Although not shown, the support 200 may also be integrated with the housing 140.

The lens holder 233 may include a first lens holder 2330 for supporting the second collimator lens 131b and a second lens holder 2340 for supporting the first lens holder 2330. The first lens holder 2330 may be disposed to have a plate-like shape and may include a lens supporting hole 2331 extending in the optical axis direction Z. The second collimator lens 131b may be fixed to the lens supporting hole 2331 via mechanical pressing or bonding. Furthermore, the first lens holder 2330 may be moved with respect to the support 200 in the main scanning direction X and the sub-scanning direction Y.

The second lens holder 2340 may include first and second side portions 2341 and 2342 extending in the main scanning direction X and a third side portion 2343 extending in the sub-scanning direction Y. The first and second side portions 2341 and 2342 slidably supports sides of the first lens holder 2330 and restrict a path in which the first lens holder 2330 moves in the main scanning direction X. The second lens holder 2340 may be moved with respect to the support 200 in the sub-scanning direction Y.

The adjuster 300 may include first and third adjusters 310 and 330 that may move the lens holder 133 in the sub-scanning direction Y and the main scanning direction X. The first adjuster 310 may include a first presser (e.g., a first cam 315) capable of applying a first adjustment force to the lens holder 133 in the sub-scanning direction Y and a first elastic member 317 capable of generating a recovery force against the first adjustment force applied by the first cam 315. The first cam 315 may be pressed against the second side portion 2342 and apply a pressure to the lens holder 233 in the sub-scanning direction Y. The first elastic member 317 may be implemented as a leaf spring, for example, may be supported on the top surface of the first side 2341, and may apply a recovery force to the lens holder 233 in the sub-scanning direction Y.

The third adjuster 330 may include a third presser (e.g., a second cam 333) capable of applying a third adjustment force to the first lens holder 2330 in the main scanning direction X and a second elastic member 332 capable of generating a recovery force against the third adjustment force applied by the second cam 333. The second cam 333 may be disposed to be pressed against a side surface in the main scanning direction X of the first lens holder 2330. The second elastic member 332 may be implemented as a leaf spring, for example, may be supported by the other side surface of the first lens holder 2330, and may apply a recovery force to the first lens holder 2330 in the main scanning direction X.

Hereinafter, movement of the lens holder 233 by the first and third adjusters 310 and 330 will be described.

Figure 15A:
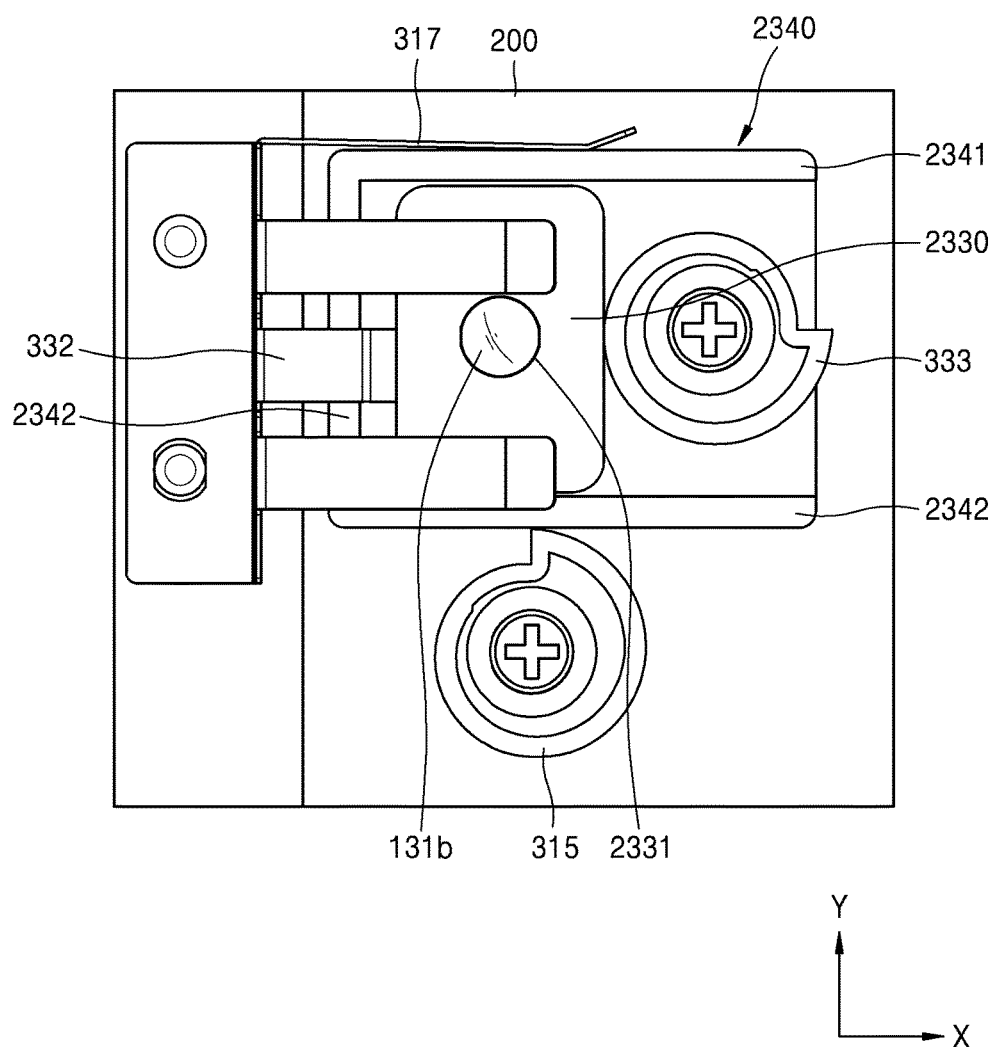
FIGS. 15A and 15B are plan views of optics according to an example embodiment.
Figure 15B:
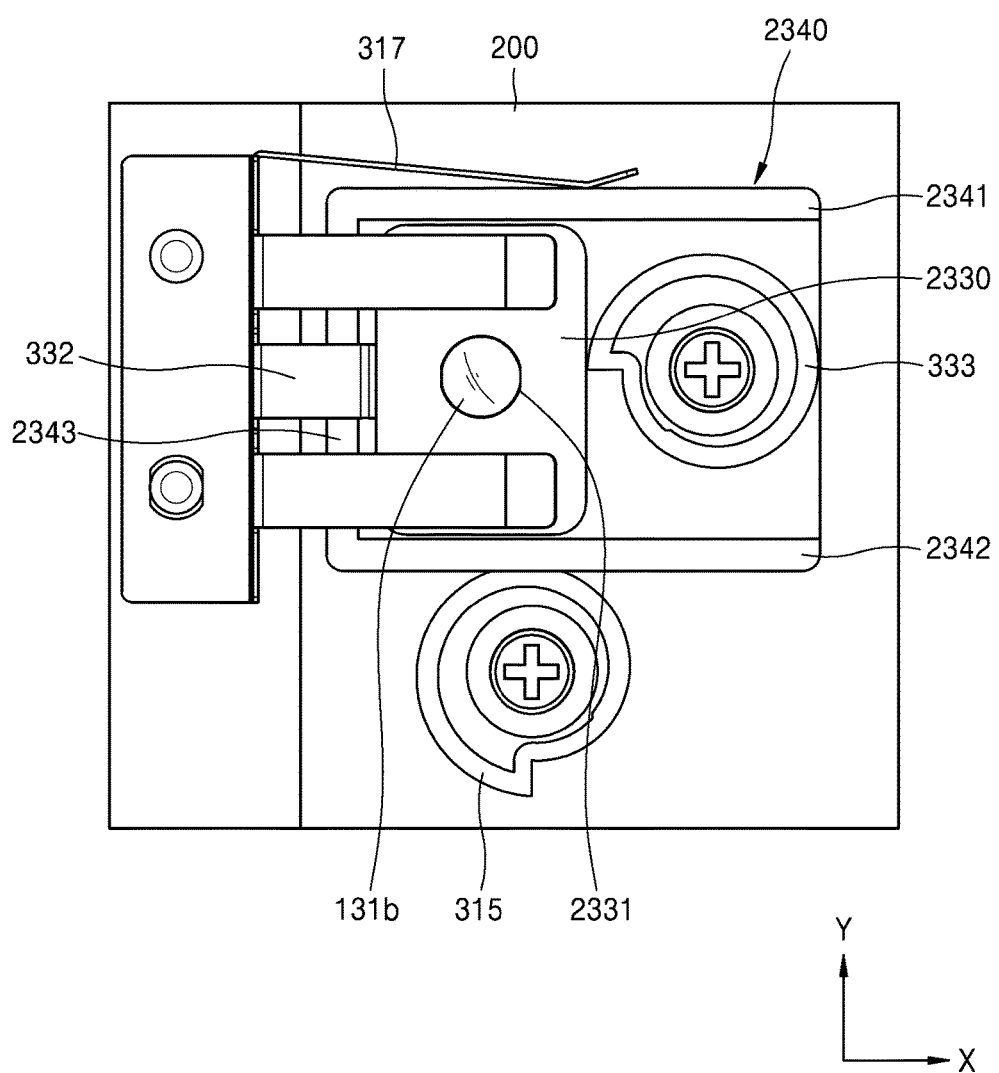

FIGS. 15A and 15B are plan views of optics according to an example embodiment.

Referring to FIGS. 14, 15A, and 15B, when the first cam 313 is rotated, the second lens holder 2340 pressed against the first cam 313 may be raised in the sub-scanning direction Y. When the first cam 313 is rotated in the opposite direction, the adjustment force applied by the first cam 313 may be removed, and the second lens holder 2340 pressed against the first elastic member 312 may be moved upward in the sub-scanning direction Y by the recovery force of the first elastic member 312.

When the second cam 333 is rotated, the first lens holder 2330 pressed against the second cam 333 may be moved to the left in the main scanning direction X. When the second cam 333 is rotated in the opposite direction, the adjustment force applied by the second cam 333 may be removed, and the first lens holder 2330 pressed against the second elastic member 332 may be moved to the right in the main scanning direction X by the recovery force of the second elastic member 332.

As described above, as the lens holder 133 is moved in the sub-scanning direction Y and the main scanning direction X, the second collimator lens 131b may also be moved in the sub-scanning direction Y and the main scanning direction X. When the second collimator lens 131b is moved in the sub-scanning direction Y and the main scanning direction X, the position error Δm of the second beam spot P2 in the main scanning direction X and the position error Δn of the second beam spot P2 in the sub-scanning direction Y may be compensated for.

Figure 16:
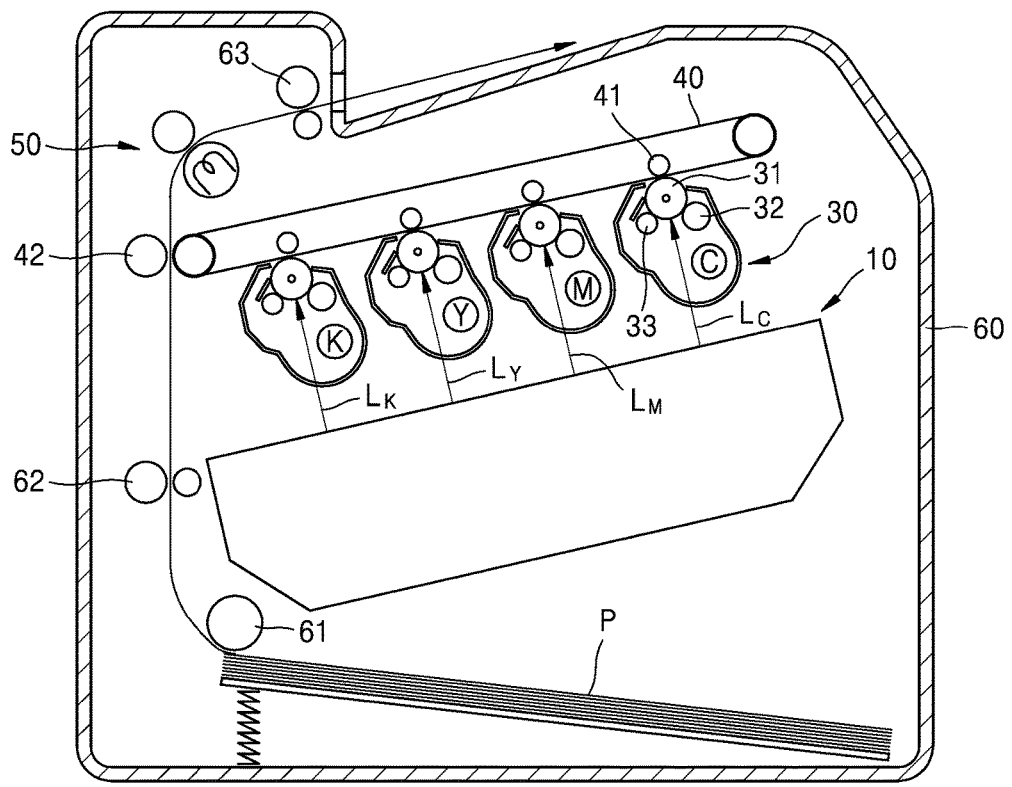
FIG. 16 is a schematic diagram showing a configuration of an electrophotography-type image forming apparatus employing the light scanning device described above.

FIG. 16 is a schematic diagram showing a configuration of an electrophotography-type image forming apparatus employing the light scanning device described above.

An image forming apparatus 1 according to the present embodiment includes the light scanning device 10, a developer 30, an intermediate transfer belt 40, first and second transfer rollers 41 and 42, and a fixer 50, wherein the above-stated components are accommodated in a cabinet 60.

The light scanning device 10 is a device for scanning a plurality of light beams and may be any of the light scanning devices according to the embodiments described above with reference to FIGS. 1 through 15. For example, the light scanning device 10 may scan light beams LK, LY, LM, and LC corresponding to colors including black (K), magenta (M), yellow (Y), and cyan (C). The number of light beams corresponding to each color may be two or greater. The light scanning device 10 may include four light scanning devices as shown in FIGS. 1 through 15. Furthermore, the light scanning device 10 may include the two light deflectors 15, and light beams respectively corresponding to two colors may be paired with each other and share a common light deflector 15. Furthermore, the light scanning device 10 may include a single light deflector 15, and light beams corresponding to four colors may share the single light deflector 15. The developer 30 may be disposed for each color in correspondence to a plurality of light beams. For example, the one developer 30 may be disposed for each color of black (K), magenta (M), yellow (Y), and cyan (C). Each of the developers 30 includes a photosensitive drum 31, which is an image receptor on which an electrostatic latent image is formed for each color and a developing roller 32 for developing an electrostatic latent image to form a toner image.

The photosensitive drum 31 is an example of image receptors and includes a photosensitive layer having a certain thickness on the outer circumferential surface of a cylindrical metal pipe. The outer circumferential surface of the photosensitive drum 31 becomes a target scanning surface. The photosensitive drums 31 are exposed to the outside of the developers 30 and are arranged a certain distance apart from one another in the sub-scanning direction Y. Instead of the photosensitive drum 31, a photosensitive belt may be employed as an image receptor.

A charging roller 33 is disposed at the upstream side of a location of the outer peripheral surface of the photosensitive drum 31, the location exposed by the light scanning device 10 with respect to the rotating direction of the photosensitive drum 31. The charging roller 33 is an example of chargers that contacts the photosensitive drum 31 and rotates to charge the surface thereof with a uniform potential. A charging bias is applied to the charging roller 33. A corona charger (not shown) may be used instead of the charging roller 33. The developing roller 32 attaches toner to the outer peripheral surface thereof and supplies the toner to the photosensitive drum 31. A developing bias for supplying the toner to the photosensitive drum 31 is applied to the developing roller 32. Although not shown, each of the developers 30 may further include a supply roller for attaching toner accommodated therein to the developing roller 32, a restricting member for restricting an amount of toner attached to the developing roller 32, an alternator (not shown) for transporting toner accommodated in the developer 30 to the supply roller and/or the developing roller 32, etc.

The intermediate transfer belt 40 faces the outer peripheral surface of the photosensitive drum 31 exposed to the outside of the developer 30. The intermediate transfer belt 40 is an example of intermediate transfer bodies for transferring a toner image of the photosensitive drum 31 to a paper P. Instead of the intermediate transfer belt 40, an intermediate transfer drum may be used as an intermediate transfer body. The intermediate transfer belt 40 contacts the photosensitive drum 31 and is circularly-driven. The four first transfer rollers 41 are disposed at positions facing the respective photosensitive drums 31 across the intermediate transfer belt 40 therebetween. A first transfer bias is applied to the first transfer roller 41, thereby transferring the toner image of the photosensitive drum 31 to the intermediate transfer belt 40.

The second transfer roller 42 is disposed so as to face the intermediate transfer belt 40, such that the paper P passes therebetween. A second transfer bias is applied to the second transfer roller 42, such that the toner image of the intermediate transfer belt 40 is transferred to the paper P.

A color image forming process based on a configuration as described above will be described.

The photosensitive drum 31 of each of the developers 30 is charged to a uniform potential by a charging bias applied to the charging roller 33.

The light scanning device 10 exposes the target scanning surface of the photosensitive drum 31 in the lengthwise direction, that is, a main scanning direction. The target scanning surface moves in a sub-scanning direction due to the rotation of the photosensitive drum 31, and thus 2-dimensional electrostatic latent images corresponding to image data regarding colors black (K), magenta (M), yellow (Y), and cyan (C) are respectively formed on the target scanning surfaces of the four photosensitive drums 31. Here, the sub-scanning direction is a direction perpendicular to the main scanning direction. The four developers 30 supply toners of the colors black (K), magenta (M), yellow (Y) and cyan (C) to the photosensitive drums 31, thereby forming toner images of the colors black (K) , magenta (M), yellow (Y), and cyan (C).

When the toner images of the colors black (K), magenta (M), yellow (Y), and cyan (C) respectively formed on the photosensitive drums 31 are overlapped with each other on the intermediate transfer belt 40 by a first transfer bias applied to the first transfer roller 41, the toner images are transferred to the intermediate transfer belt 40, and thus a color toner image is formed.

A medium that finally receives toner, e.g., the paper P, is transported by a pickup roller 61 and a transporting roller 62 and is introduced between the intermediate transfer belt 40 and the second transfer roller 42. The color toner image transferred to the intermediate transfer belt 40 is transferred to the paper P by a second transfer bias applied to the second transfer roller 42. The color toner image transferred to the paper P is maintained on a surface of the paper P by an electrostatic force. The paper P having transferred thereto the color toner image is transported to the fixer 50. The color toner image transferred to the paper P receives heat and pressure from a fixing nip of the fixer 50 and is fixed to the paper P. The paper P to which the color toner image is fixed is discharged out of the image forming apparatus by a discharging roller 63.

It has been described above that the image forming apparatus according to the present embodiment forms a color image. However, the present disclosure is not limited thereto. For example, in a case of forming a black-and-white monochrome image, the light scanning device 10 may scan a light beam regarding one color and the one developing roller 32 may be disposed. Furthermore, in the image forming apparatus according to the present embodiment, the components other than the light scanning device 10, that is, the developer 30, the intermediate transfer belt 40, the first and second transfer rollers 41 and 42, the fixer 50 are described as an example of components constituting an electrophotography-type printing device for transferring a toner image to a printing medium, and another printing device known in the art may be applied to an image forming apparatus according to the present disclosure.

The image forming apparatus may be a laser beam printer, a digital copying machine, an multifunction printer (MFP), etc.

According to light scanning devices according to the above embodiments and image forming apparatuses including the same, a position error of a beam spot formed on an object to be exposed may be compensated for by adjusting the position of optics. Furthermore, beam spots formed on an object to be exposed by light beams emitted from a plurality of light sources may be aligned at a uniform interval.

Light scanning devices according to the above embodiments and image forming apparatuses including the same may minimize mechanical adjusting structures, thereby reducing the total number of parts and simplifying the overall manufacturing process.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as .defined by the following claims.

What is claimed is:

1. A light scanning device comprising:
   a first light source and a second light source to emit a first light beam and a second light beam to a target scanning surface, respectively;
   optics including:
      a first lens to transmit the first light beam,
      a second lens to transmit the second light beam, and
      a lens holder that movably supports the second lens with respect to the first lens in a sub-scanning direction with respect to a main scanning direction on the target scanning surface and along an optical axis direction of the second light source; and
   a housing that supports the first light source and the second light source and the optics, wherein the first light source, the second light source and the first lens are fixed to the housing.

2. The light scanning device of claim 1, wherein:
   the first lens is coupled to be fixed to the housing; and
   the optics includes an adjuster to move the lens holder with respect to the housing.

3. The light scanning device of claim 2, wherein the adjuster comprises:
   a first adjuster to move the lens holder in the sub-scanning direction; and
   a second adjuster to move the lens holder in the optical axis direction.

4. The light scanning device of claim 3, wherein the lens holder comprises:
   a first lens holder that supports the second lens, and
   a second lens holder that slidably supports the first lens holder,
      wherein the first lens holder is slidable in the optical axis direction with respect to the second lens holder.

5. The light scanning device of claim 4, wherein
   the first adjuster comprises:

a first presser to apply a first adjustment force to the first lens holder and the second lens holder in the sub-scanning direction, and a first elastic member to apply a recovery force in a direction opposite the sub-scanning direction, and the second adjuster comprises:

a second presser to apply a second adjustment force to the first lens holder in the optical axis direction, and a second elastic member to apply a recovery force in a direction opposite the optical axis direction.

6. The light scanning device of claim 5, wherein the first presser and the second presser press against different surfaces of the first lens holders, respectively.

7. The light scanning device of claim 4, wherein
the first adjuster comprises a transporter to transport the first lens holder and the second lens holder in the sub-scanning direction, and
the second adjuster comprises:
a presser to apply an adjustment force to the first lens holder in the optical axis direction, and
an elastic member to apply a recovery force in a direction opposite the optical axis direction.

8. The light scanning device of claim 7, wherein
the transporter comprises:
a lead screw installed in the sub-scanning direction, and
a gear disposed at the second lens holder, the gear to interlock with the lead screw, and
the presser presses against a surface of the first lens holder.

9. The light scanning device of claim 3, further comprising:
at least one sensor on which some of the first light beam and some of the second light beam are incident; and
a controller to control starting emission times of the first light beam and the second light beam respectively from the first light source and the second light source based on a time difference between signals obtained from the at least one sensor, the signals indicating that the at least one sensor has detected the first light beam and the second light beam.

10. The light scanning device of claim 2, wherein the adjuster comprises:
a first adjuster to move the lens holder in a sub-scanning direction; and
a third adjuster to move the lens holder in a main scanning direction.

11. The light scanning device of claim 10, wherein the lens holder comprises:
a first lens holder that supports the second lens, and
a second lens holder that slidably supports the first lens holder,
wherein the first lens holder is supported to be able to slide in the optical axis direction with respect to the second lens holder.

12. The light scanning device of claim 11, wherein the first adjuster comprises:
a first presser to apply a first adjustment force to the first and second lens holders in the sub-scanning direction, and a first elastic member to apply a recovery force in a direction opposite the sub-scanning direction, and
the third adjuster comprises:
a third presser to apply a third adjustment force to the first lens holder in the main scanning direction, and
a third elastic member to apply a recovery force in a direction opposite to the main scanning direction.

13. The light scanning device of claim 12, wherein
the first presser is a first cam pressing against a surface of the second lens holder in the main scanning direction, and
the third presser is a second cam pressing against a surface of the first lens holder in the sub scanning direction.

14. The light scanning device of claim 1, wherein the second lens is bonded to the lens holder.

15. The light scanning device of claim 14, further comprising:
a bonding device to fix the first lens to the housing; and
an adjuster to move the lens holder with respect to the housing, while the second lens is bonded to the lens holder.

16. The light scanning device of claim 15, wherein the adjuster comprises:
a presser to apply an adjustment force to the lens holder in a sub-scanning direction, and
an elastic member to apply a recovery force in a direction opposite to the sub-scanning direction.

17. The light scanning device of claim 16, wherein the presser is a screw supported by a surface of the lens holder.

18. The light scanning device of claim 1, wherein the first lens and the second lens are collimator lenses to shape the first light beam and the second light beam into collimated light beams, respectively.

19. An electrophotography-type image forming apparatus comprising:
an image receptor;
a light scanning device to form an electrostatic latent image by scanning a first light beam and a second light beam to a target scanning surface of the image receptor, the light scanning device comprising:
a first light source and a second light source to emit the first light beam and the second light beam, respectively;
optics including:
a first lens to transmit the first light beam,
a second lens to transmit the second light beam, and
a lens holder that movably supports the second lens with respect to the first lens in a sub-scanning direction with respect to a main scanning direction on the target scanning surface and along an optical axis direction of the second light source; and
a housing that supports the first light source and the second light source and the optics, wherein the first light source, the second light source and the first lens are fixed to the housing; and
a developer to develop the electrostatic latent image formed on the image receptor, wherein the developer supplies toner to the electrostatic latent image.

* * * * *